United States Patent [19]

Bibl et al.

[11] Patent Number: 4,784,080
[45] Date of Patent: Nov. 15, 1988

[54] MULTI-SEGMENT TONING SHOE FOR LATENT IMAGE DEVELOPMENT

[75] Inventors: Andreas Bibl, Los Altos; Gene F. Day, Hillsborough, both of Calif.

[73] Assignee: Precision Image Corporation, Redwood City, Calif.

[21] Appl. No.: 8,612

[22] Filed: Jan. 29, 1987

Related U.S. Application Data

[63] Continuation-in-part of Ser. No. 796,872, Nov. 12, 1985, Pat. No. 4,665,165, which is a continuation-in-part of Ser. No. 763,040, Aug. 6, 1985.

[51] Int. Cl.[4] .......................................... G03G 15/06
[52] U.S. Cl. ................................. 118/648; 118/652; 118/660; 355/10
[58] Field of Search ................. 355/10; 118/647, 648, 118/650, 652, 660, 258, 259

[56] References Cited

U.S. PATENT DOCUMENTS

| | | | |
|---|---|---|---|
| 3,196,832 | 7/1965 | Zin | 118/660 |
| 3,416,943 | 12/1968 | Clark et al. | 118/409 X |
| 3,656,173 | 4/1972 | Fussel | 346/74 ES |
| 3,664,298 | 5/1972 | Glaimo, Jr. | 118/647 X |
| 3,892,886 | 7/1975 | Schmidt et al. | 118/258 X |
| 4,006,709 | 2/1977 | Miyakawa et al. | 118/648 |
| 4,013,356 | 3/1977 | Bestenreiner et al. | 355/10 |
| 4,146,324 | 3/1979 | Komori et al. | 118/647 X |
| 4,179,210 | 12/1979 | Bestenreiner et al. | 118/647 X |
| 4,236,483 | 12/1980 | Davis et al. | 118/647 |
| 4,270,859 | 6/1981 | Galbraith et al. | 355/10 |
| 4,482,242 | 11/1984 | Moraw et al. | 355/10 |
| 4,545,326 | 10/1985 | Carl | 118/660 |
| 4,623,241 | 11/1986 | Buchan et al. | 118/647 X |
| 4,678,312 | 7/1987 | Shiozawa et al. | 355/10 X |

OTHER PUBLICATIONS

Webster's Ninth New Collegiate Dictionary, Copyright 1986 by Merriam-Webster Inc., p. 56.

Primary Examiner—Shrive Beck
Assistant Examiner—Alain Bashore
Attorney, Agent, or Firm—Thomas Schneck

[57] ABSTRACT

A toning shoe for applying fluid developer to a latent image on a supported sheet. A drum is the preferred support, with the toning shoe having raised upstream and downstream support rims contacting the sheet, opposed lateral insulating rims spaced very slightly from the sheet or conducting rims contacting the sheet and a recessed multi-segmented electrode further spaced from the sheet. Fluid developer is injected through slits at leading edges of the electrode segments, flows as a thin film between the electrode segments and the sheet and then passes through drains at trailing edges of the electrode segments for collecting and recycling. The shoe moves laterally as the drum rotates so that development occurs in a helical stripe pattern.

21 Claims, 7 Drawing Sheets

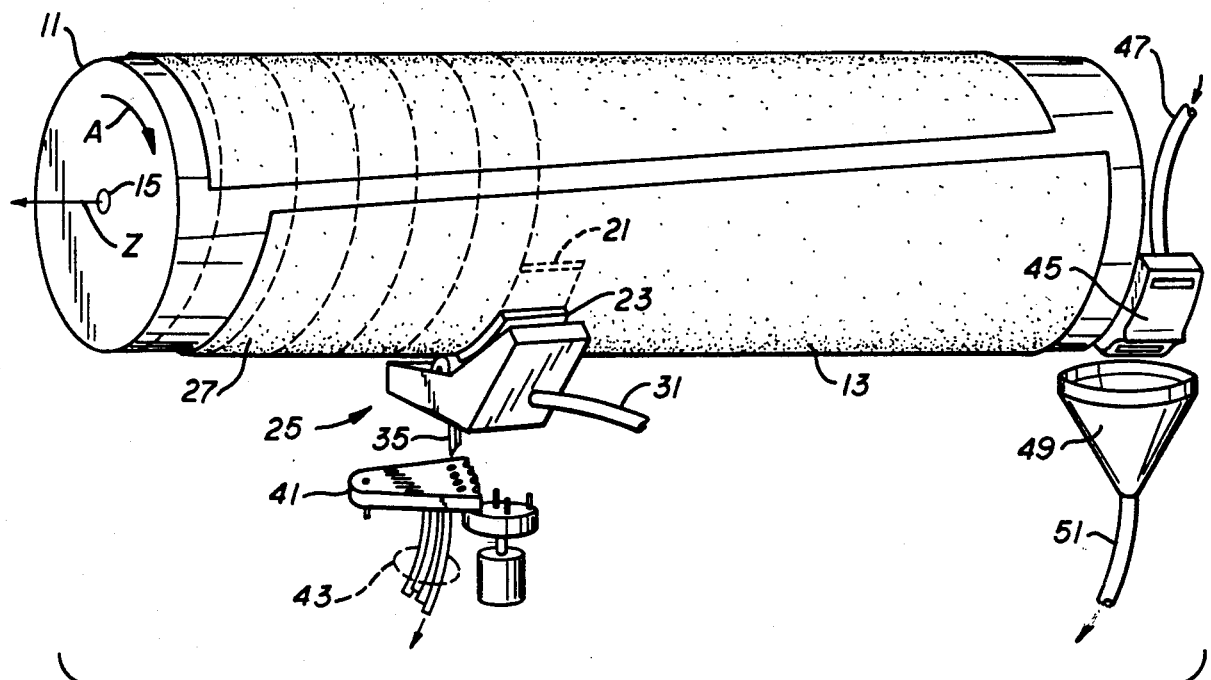
FIG._1.
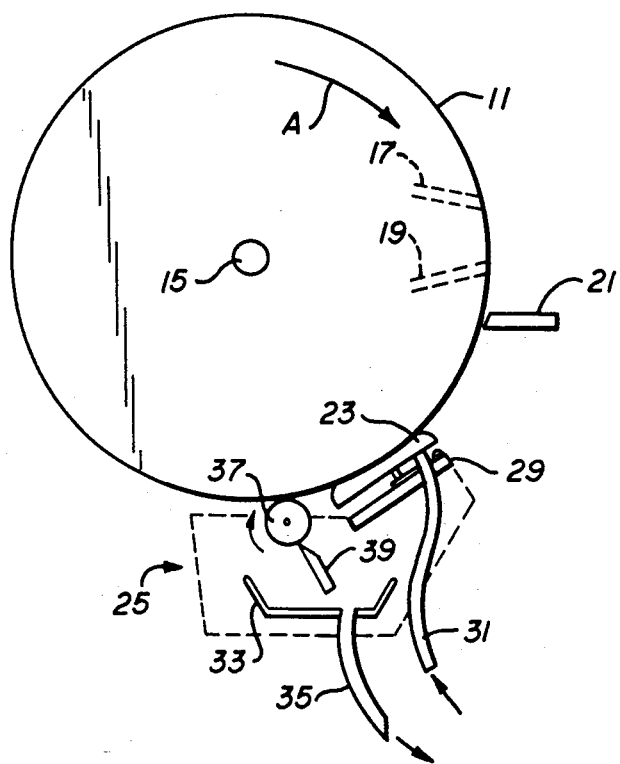
FIG._2.

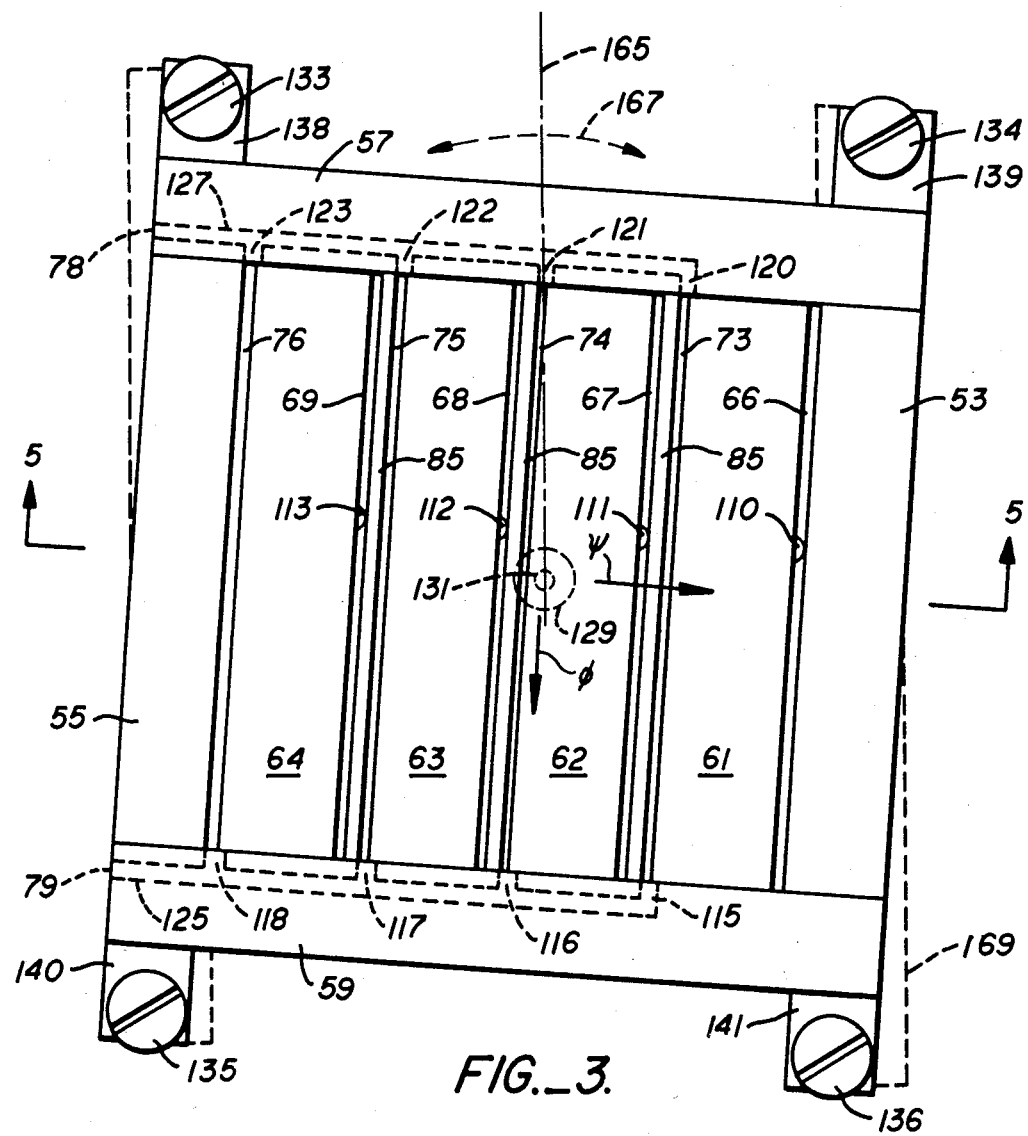
FIG._3.
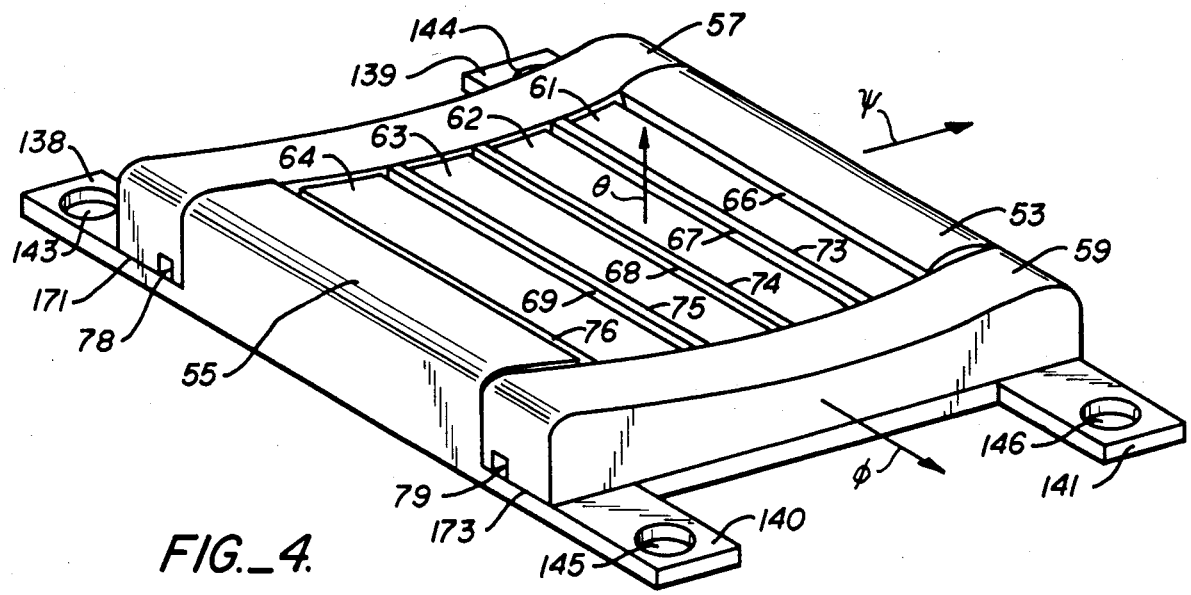
FIG._4.

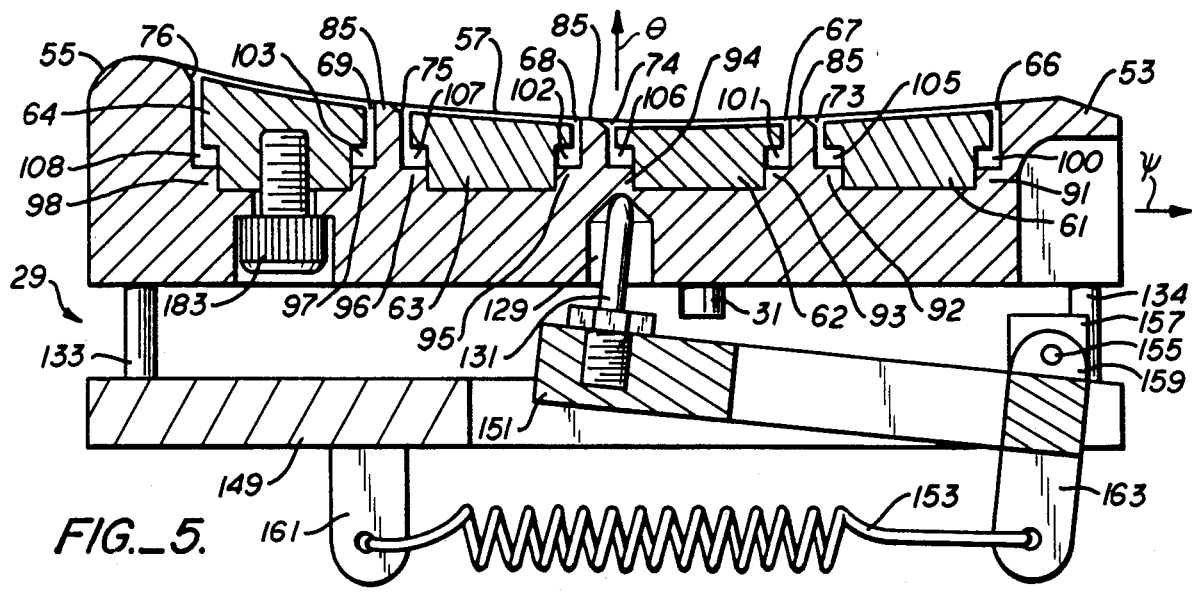
FIG._5.
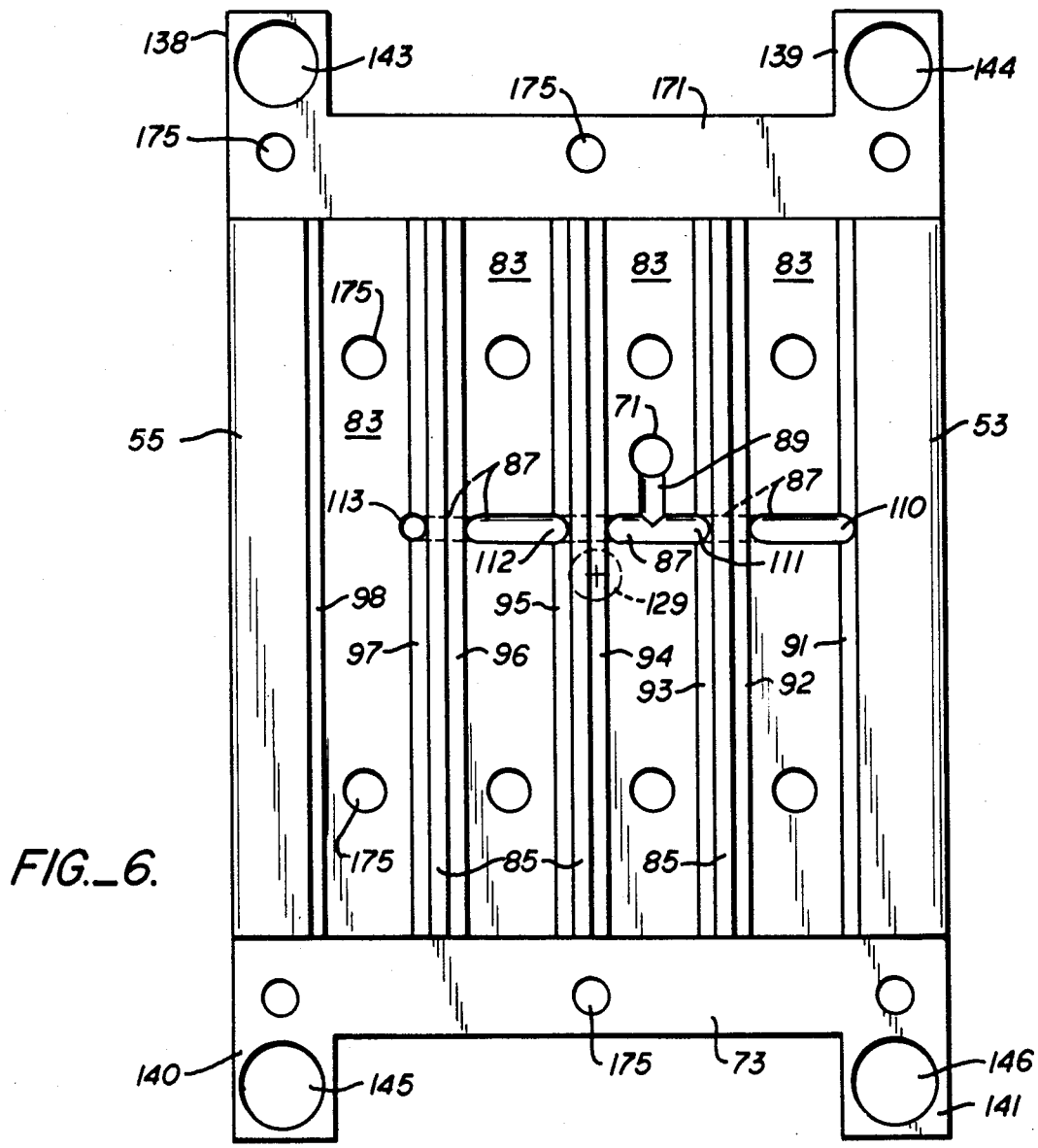
FIG._6.

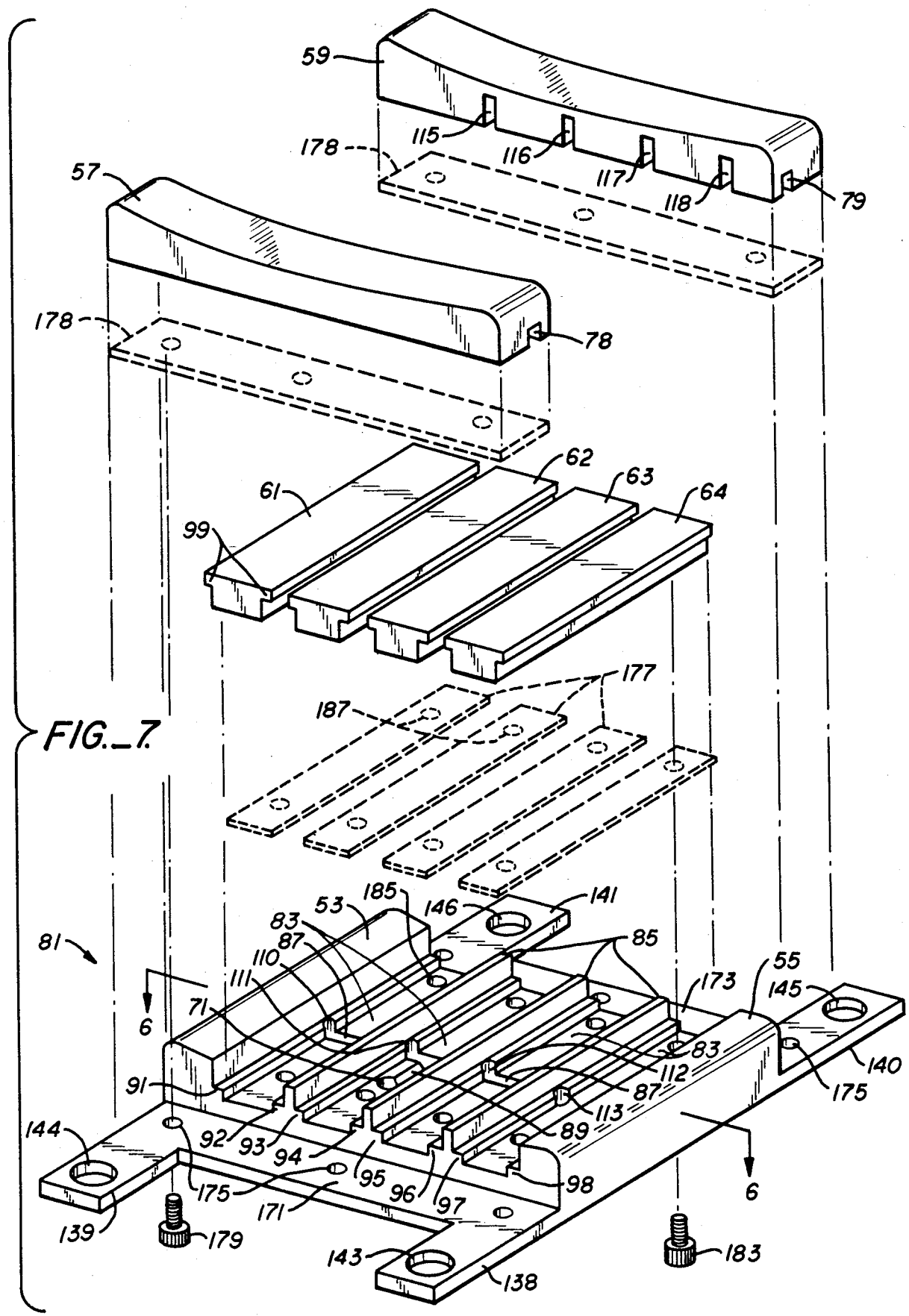

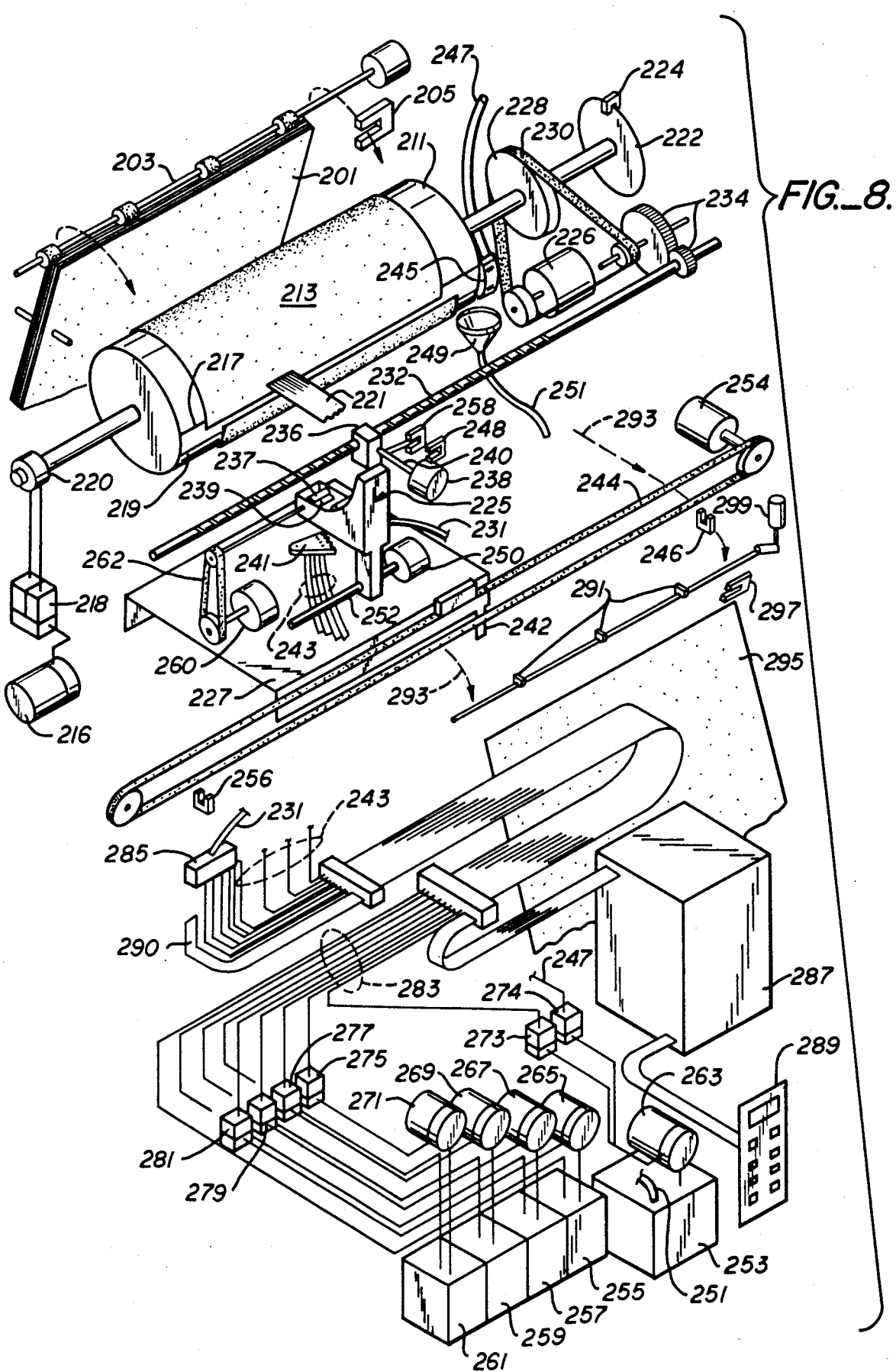
FIG._8.

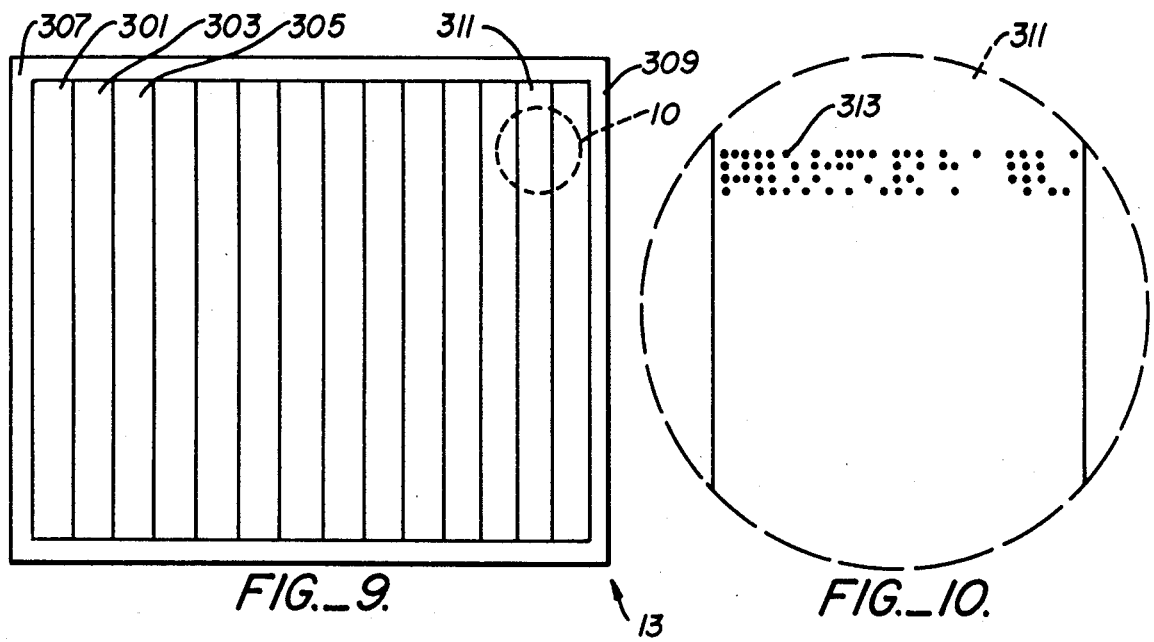
FIG._9.  FIG._10.
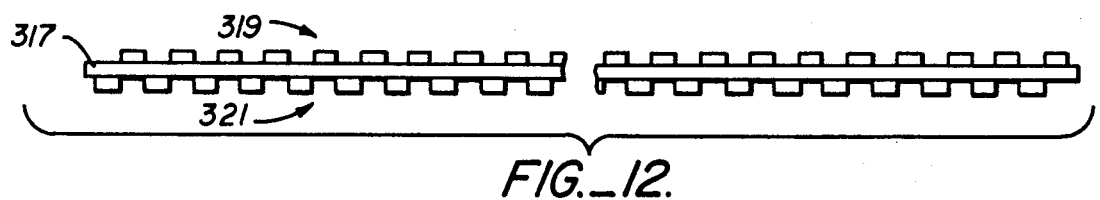
FIG._12.
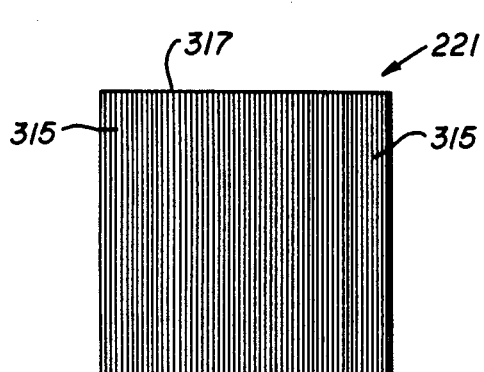
FIG._11.
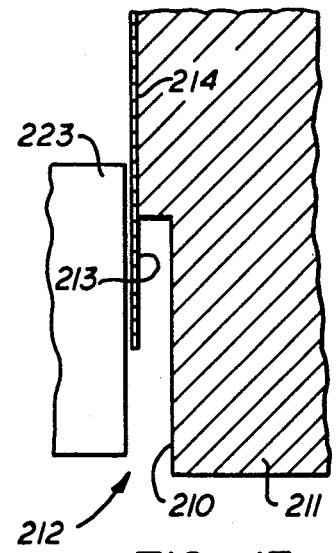
FIG._13.
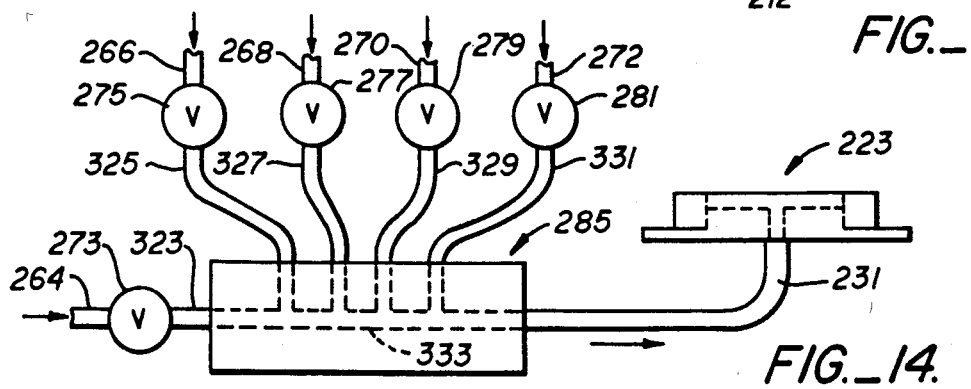
FIG._14.

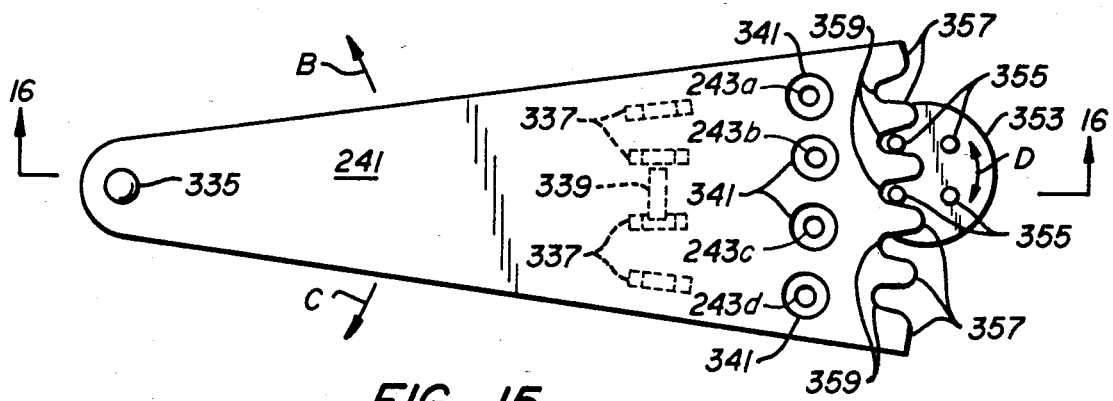
FIG._15.
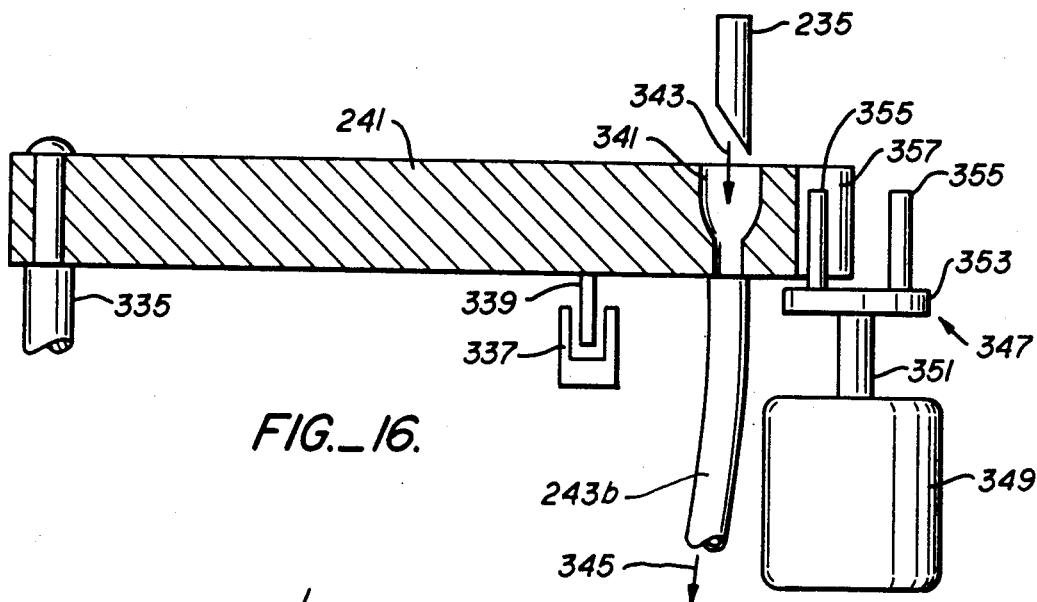
FIG._16.
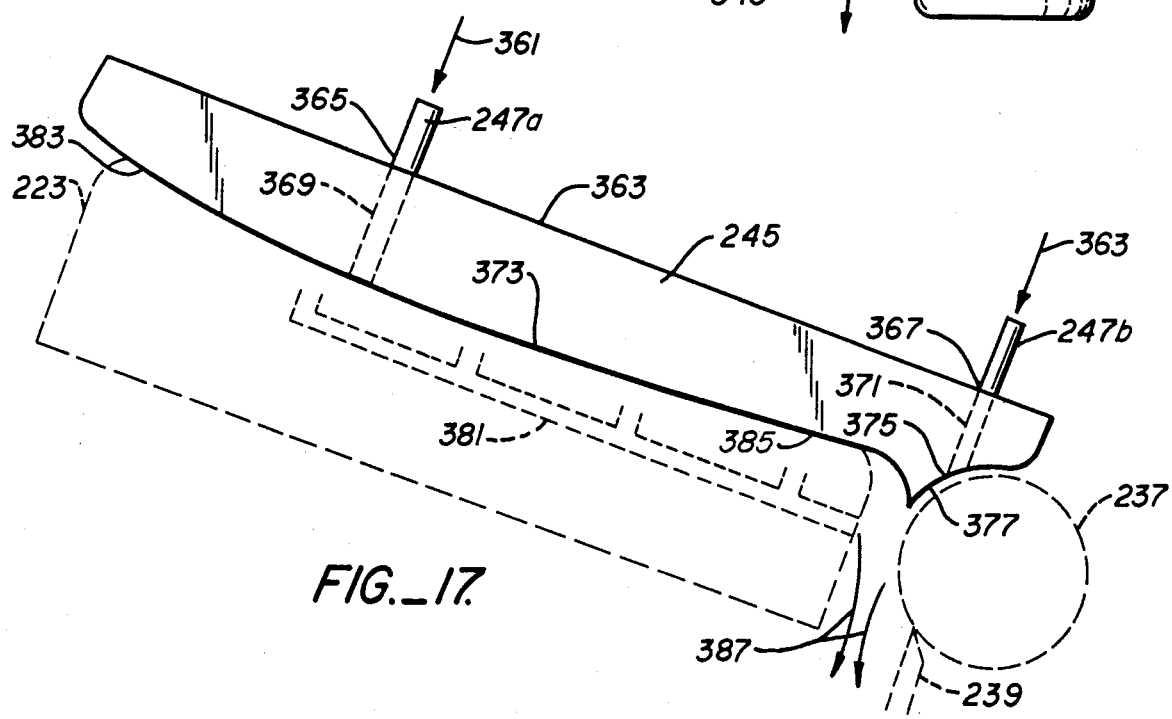
FIG._17.

MULTI-SEGMENT TONING SHOE FOR LATENT IMAGE DEVELOPMENT

CROSS REFERENCE TO RELATED APPLICATION

This application is a continuation-in-part of U.S. patent application Ser. No. 796,872 filed Nov. 12, 1985, now U.S. Pat. No. 4,665,165, which is a continuation-in-part of U.S. patent application Ser. No. 763,040, filed Aug. 6, 1985.

TECHNICAL FIELD

The invention relates to developing of latent images and more particularly to a structure for applying a fluid developer to supported sheets in order to develop a latent image into a visible image.

BACKGROUND ART

In electrostatic drum printing on sheets, such as in same facsimile machines, an electrostatic latent image of the sheets is developed into a visible image, usually by applying a liquid suspension of toner particles to the sheets. See for example, U.S. Pat. No. 3,656,173 to R. Fussel. The developer typically must remain on contact with the sheets for about one second to obtain in adequate image contrast. Attempts have been made to increase the rate of printing by increasing the speed of rotation of the drum. However, this sometimes results in a loss of image contrast or density.

In U.S. Pat. No. 4,482,242 to Moraw et al., a latent charge image on a drum is developed by moving the drum through a pool of developer liquid in a developing shoe. The excess liquid is removed by spillage off the edges of the shoe, and by a fast moving roller contacting the drum.

U.S. Pat. No. 4,270,859 to Galbraith et al. provides a pre-wet shoe for depositing a liquid dispersant onto photoconductive paper before development, and a toner shoe adjacent to the paper for applying toner to a latent image on the paper. Toner is applied across the width of an entire sheet. The toner fluid flows in the shoe to the paper, then downhill along the paper to an outlet of the shoe. The toning shoe is raised by a lifting mechanism to a prescribed distance from the drum surface, and the shoe does not contact the drum.

As toner fluid flows in a shoe downhill along the paper, toner particles are deposited on the paper to develop the latent image and the concentration of toner particles in the fluid decreases accordingly. A deposition rate for toner particles that is proportional to the concentration of toner particles in the fluid results in an exponential decrease in toner particle concentration with distance along the shoe. Accordingly, most of the toner particles are applied to the latent image near the beginning of the flow, and depending on the particle deposition rate, the effective length of the toning shoe is reduced to about ¼ to ½ of the actual toning shoe length. In some cases, inadequate image contrast may result. Toner deposition by the toning shoe may be increased by starting with a greater concentration of toner particles, but this can result in background staining or image smearing. Alternatively, the deposition rate may be decreased so that particles are deposited over a greater length of the shoe, but this has no benefit for the image contrast. Increasing the actual length of the toning shoe has little effect on increasing the effective length of the toning shoe, and increasing the drum speed can have a deleterious effect on image contrast and density.

It is also desirable to devise a toning shoe or "development electrode" that allows the use of a print head with helical stripe scanning thereby obtaining a faster printing speed. An even faster print speed could be obtained if the time of fluid developer contact with the sheet could be reduced to less than a full second. However, it is imperative that vital image contrast not be lost. Also streaking and uneven developing must be avoided.

An object of the invention is to devise a developer applicator for a supported latent image, particularly a structure which allows rapid helical stripe pattern printing with improved image contrast and density without streaking or uneven imaging at stripe edges.

DISCLOSURE OF THE INVENTION

The above object has been met with a developer applicator structure, called a "toning shoe", having a multi-segment electrode, each segment of which applies a flowing stream of fluid developer to a supported sheet having a latent image thereon. In the case of a drum-supported sheet, the shoe is made to scan the sheet in a helical stripe pattern. The toning shoe has raised upper and lower rim support surfaces which contact the imaging surface, raised arcuate lateral rims near opposed lateral edges of the stripe, and a plurality of central recessed electrode segments very closely spaced from the sheet. The lateral rims may be either electrically insulating and slightly relieved so as to not quite touch the sheet, or electrically conductive and contacting the sheet. The shoe has a slit near the leading or upper edge of each electrode segment for injecting fluid developer under pressure in the spaces between the sheet and the recessed areas of the shoe. Developer flows toward drain channels defined near the trailing or lower edge of each electrode segment of the shoe, flows through passageways formed in the lateral rims, and then spills into a sump for recycling.

An advantage of the multi-segmented electrode is that spent fluid developer or "toner" is periodically replaced by fresh toner at each electrode segment. In this manner, the effective length of the toning shoe is increased to become a substantial portion of the actual toning shoe length. Improved image contrast is a result.

Another advantage of the present invention is that fluid developer or toner is applied to a localized area during drum rotation, corresponding to a helical column or helical stripe. The raised lateral rims, if made of an electrically insulating material, are slightly out of contact with the sheet to prevent streaking, yet still effectively confine the toner to the stripe being developed. The upstream and downstream rim support surfaces provide that the recessed area is very closely spaced from the sheet. This close spacing increases the deposition of developer so that only brief developer contact is needed to develop the latent image to the desired intensity. The shoe is physically simple so it is inexpensive and can be easily cleaned by periodically wiping it off. The toning shoe, by successively applying different developers, one of each primary color, may also be used to develop color images.

For developing electrostatic latent images on a sheet the recessed area is an electrode. The fluid developer is then a liquid toner.

As the drum rotates, the toning shoe is moved laterally parallel to the drum axis with the shoe contacting the supported sheet so that developer flowing in the shoe is directly applied to the sheet. A helical stripe, scanning pattern results.

BRIEF DESCRIPTION OF THE DRAWINGS

FIG. 1 is a simplified perspective view of a drum supported sheet and toning shoe in accord with the present invention.

FIG. 2 is a side plan view of a sheet-supporting, rotating drum with a print head and toning shoe.

FIG. 3 is a front plan view of a toning shoe of the present invention.

FIG. 4 is a front perspective view of the toning shoe illustrated in FIG. 3.

FIG. 5 is a side sectional view of the toning shoe in FIG. 3 with a shoe biasing mechanism in accord with the present invention.

FIG. 6 is a front plan view of the frame of the toning shoe in FIG. 3 without lateral rim blocks and electrode segments.

FIG. 7 is an exploded perspective view of the toning shoe illustrated in FIG. 3.

FIG. 8 is an exploded detailed plan perspective view of a printer apparatus employing a toning shoe of the present invention.

FIG. 9 is a layout view of a sheet illustrating the scanning pattern of the apparatus in FIG. 8.

FIG. 10 is a detail of the sheet illustrated in FIG. 9.

FIG. 11 is a partial top view of a scanning head employed in the printer of FIG. 8.

FIG. 12 is a magnified front edge view of the scanning head illustrated in FIG. 11.

FIG. 13 is a sectional view of an edge of the drum of FIG. 2, with a sheet supported thereon and a toning shoe adjacent to the sheet.

FIG. 14 is a simplified side view of a toner selection valve unit for use with a toning shoe of the present invention.

FIG. 15 is a top plan of a drain selector foot in accord with the present invention.

FIG. 16 is a side sectional view taken along the line 16—16 in FIG. 15.

FIG. 17 is a side plan view of a cleaning station in accord with the present invention engaging the toning shoe of FIG. 3, shown in phantom, and a drying roller, also shown in phantom.

BEST MODE FOR CARRYING OUT THE INVENTION

The preferred embodiment of the invention involves toning of an electrostatic latent image on a sheet. However, other latent images, in non-electrostatic media, could also be developed. For non-electrostatic media, the electrodes described herein would not be needed.

With reference to FIGS. 1 and 2, drum 11 may be seen supporting a sheet of paper 13 for rotation. An axle 15 located on the longitudinal axis Z through the center of drum 11 supports the drum and transmits rotational power from a motor, not shown. While the drum rotates in the direction of arrow A, its axle 15 is fixed and so the drum does not translate laterally, only rotationally. The diameter of drum 11 is approximately 12 inches and its width is wider than sheets to be supported. The surface of the drum, extending from slightly inside the region of where paper is to be supported may be slightly relieved to prevent edge wetting when using fluid developers. The drum may have a pair of vacuum channels 17 and 19 which are passages embedded in the drum having pumped apertures on the drum's surface for holding sheet 13. Preferably, the channels should be spaced so as to secure the top and bottom edges of a sheet. Channels 17 and 19 are evacuated by means of a vacuum pump, not shown.

An electrostatic head 21, for creating an electrostatic latent image, is in mechanical contact with the paper sheet 13, applying charge thereto. Head 21 is translated laterally, parallel to the longitudinal axis Z of the drum 11. The head has a forward edge in contact with the sheet 13, with a linear array of 1,024 wires forming charging elements in very close proximity to the sheet 13. The number of wires may range between 100 and 10,000. The linear array of wires will be explained more fully below, with reference to FIGS. 11 and 12. Sheet 13 is coated so that it is a charge retaining-dielectric medium. Such charge-retaining dielectric sheets are commercially available, and are sold under the designation ELECTROGRAHIC PAPER sold by James River Corporation. The drum operates at electrical ground or at a positive potential. The charging elements are at a negative potential of 400 to 600 volts relative to the drum. Polarities may be reversed. No electrical current is intended to flow through the paper coating.

A multi-segment toning shoe 23, part of a toning shoe assembly 25, following head 21 and having an arcuate shape facing the drum, applies liquid toner for developing a latent image existing in the charge pattern deposited on the sheet. The latent image created by head is thus toned and formed into a visible image. Head and toning shoe assembly 25 are supported on a carrier assembly, not shown, which is connected to a lead screw. The head and toning shoe, therefore, move together laterally and continuously so that a helical stripe pattern 7, indicated by dashed lines, is traced on sheet 13 by the relative motion of the head 21 and toning shoe 23 on the one hand and the drum 11 on the other hand. Toning shoe 23 applies toner to a localized area corresponding to a column or latent image stripe.

The position of the toning shoe is one very closely spaced to sheet 13, being biased by single point biasing mechanism 29 of assembly 25. The single point biasing mechanism urges the shoe against the paper surface so that raised upstream and downstream rim support surfaces thereof are held against the paper on the drum.

Developer is supplied to toning shoe 23 through an inlet tube 31, and toning shoe 23 supplies the fluid developer or toner locally to the sheet on stripe 27. Toner flows downward as a thin film between the sheet and recessed electrode segments of the shoe, and then falls into drains defined at the lower edges of these electrode segments. The developer then falls into a sump 33 for collection and returning to the supply through drain tube 35. New developer, supplied through the inlet tube 31, flows through the wall of the shoe to manifolds therein where the supply of developer is replenished and is injected into the shoe for application to the sheet. A drying roller 37 is seen to be carried within the same housing as the shoe and contacts drum 11 for removing excess developer. Once the excess is removed, it is scraped from the drying roller by a scraper blade 39. Again, excess developer falls into the sump 33 for collection and returning of the developer to the supply.

Excess developer, collected by sump 33 in toning shoe assembly 25, is returned to the appropriate supply of color developer via drain tube 35, a drain selector foot 41 and one of a set of return lines 43. Selector foot 41 pivots so that the appropriate one of the return lines 43 is under drain tube 35. The operation of drain selector foot 41 is discussed in greater detail below with reference to FIGS. 14 and 15. Alternatively, four toning shoes, each with its own supply of color developer and its own return line, may be provided.

Also shown in FIG. 1 is a cleaning station 45 located just past the right edge of drum 11 for rinsing the toning shoe assembly 25 after each scan of a sheet 13. Cleaning solvent, such as that sold under the trademark ISOPAR is supplied through a tube 47 to cleaning station 45 where it is squirted onto toning shoe 23. The solvent removes waste developer from toning shoe 23 and drains into a funnel 49 where it is returned via a tube 51 at the base of funnel 49 to a solvent supply tank. Supply tube 47 may include a particle filter for removal of colored particles and other foreign matter from the cleaning solvent. ISOPAR is a registered trademark of Exxon Co. for a narrow-cut isoparaffinic petroleum solvent consisting predominantly of $C_{10}$ and $C_{11}$ isoparaffinic hydrocarbons. Other solvents may also be used.

In FIGS. 3–5, a detail of a multi-segment toning shoe is seen. The shoe has raised peripheral edges which include upper and lower support rims 53 and 55, respectively, and opposed lateral rims 57 and 59. The support rims 53 and 55 are brought into contact with a sheet being scanned. Within the boundary formed by the rims is a central recessed area including a multi-segmented electrode consisting of a plurality of electrode segments 61–64. Developer slits 66–69 associated with respective electrode segments 61–64 apply toner or fluid developer onto a charged sheet carrying a latent image stripe. Developer slit 66 is defined between an upper or leading edge of electrode segment 61 and upper support rim 53. Developer slits 67–69 are defined between adjacent electrode segments proximate to the leading edge of the electrode segments 62–64, respectively, with which they are associated. The toning shoe communicates with a supply of developer through an inlet line 31 connected to the underside of the shoe. An inlet bore formed in the shoe delivers developer from inlet line 31 to developer slits 66–69. Thin films of developer flow from the developer slits 66–69 into the space defined between each electrode segment 61–64 and the sheet to drain channels 3–76 defined in the shoe. Drain channels 73–75 are defined between adjacent electrode segments proximate to the lower or trailing edges of the electrode segments 613, respectively, with which they are associated. Drain channel 76 is defined between a trailing edge of electrode segment 64 and lower support rim 55. Passageways 125 and 127 in at least one of the lateral rims 57 and 59 communicate with drain channels 73–76 and permit residual excess developer to drain from the shoe out of drain ports 78 and 79 to a sump where it is collected for recycling.

Each electrode segment 61–64 is typically 0.45 inch (1.14 cm) long and 2.56 inches (6.50 cm) wide. Typically, there are four electrode segments which make up the multi-segment electrode. Each of the support rims 53 and 55 is typically about ½ inch (1.27 cm) long and 2.56 inches (6.50 cm) wide. Each of the lateral rims 57 and 59 is typically about ⅜ inch (0.95 cm) wide and 2.57 inches (6.53 cm) long. The constructed toning shoe is thus typically about 2.57 inches (6.53 cm) long and 3.31 inches (8.41 cm) wide.

Referring to FIGS. 5–7, electrode segments 61–64 are electrically conductive pieces mounted in a central recessed area of a frame 81. Frame 81 includes the upper and lower support rims 53 and 55, respectively, and a top central surface 83 between support rims 53 and 55 which forms the mounting surface for the electrode segments. A plurality of ridges or dikes 85 extend from the top surface 83, separating electrode segments 61–64. Ridges 85 thus also separate drains 73–75 for electrode segments 61–63 from slits 67–69 for succeeding electrode segments 62–64, respectively.

A fluid inlet bore 71 is formed through the back of frame 81 to the top central surface 83. Inlet bore 71 is in fluid communication with a supply of developer via an inlet line 31. Inlet bore 71 is connected to a horizontal bore or channel 87 formed in the top central surface 83 of frame 81. Horizontal bore or channel 87 extends from the leading or upper edge of surface 83 proximate to upper support rim 53, beneath electrode segment 61–63 along with their associated slits 66–68 and drain channels 73–75, to immediately beneath developer slit 69. A transverse connecting channel 89 may also be formed in surface 83 to connect inlet bore 71 to horizontal bore or channel 87. Alternatively, inlet bore 71 may lead directly to horizontal bore 87.

Ridges 85 have an inverted T-shape with steps 92–97 on each side thereof. Top central surface 83 also ends in steps 91 and 98 at upper and lower support rims 53 and 55, respectively. Electrode segments 61–64 fit snugly between steps 91–98, forming a fluid tight fit. The electrode segments have lips 99 which project toward the ridges 85 or toward the upper and lower rims 53 and 55, and thereby define developer slits 66–69, drain channels 73–76, and a plurality of plena 100–108 beneath the slits and drain channels. Input plena 100–103 communicate with horizontal bore or channel 87 by means of vertical connecting bores 110–113 respectively and deliver developer to respective slits 66–69. Drain plena 105–108 receive developer from respective channels 73–76 and transport the developer transversely toward one or both lateral rims 57 and 59. Drain plena 105–108 do not connect with horizontal bore or channel 87. Instead the drain plena connect with lengthwise drain passageways 125 and 127, seen in FIG. 3, via transverse drain connections 115–123. Drain passageways 125 and 127 terminate at drain ports 78 and 79 where fluid developer spills into a sump for collection.

With reference again to FIGS. 3–5, support rims 53 and 55 contact and conform to the shape of the charge retentive sheet on the drum. Lateral rims 57 and 59 typically are electrically insulating and relieved by about 0.1 to 0.2 mil (2.5 to 5.1 μm) so as to not quite touch the sheet. Lateral rims 57 and 59 may be relieved by as much as 2.0 mil (50.8 μm) yet still be sufficiently close to the sheet to confine the toner flow to a localized area adjacent multi-segmented electrode with little leakage. Alternatively, lateral rims 57 and 59 may be electrically conductive and unrelieved so as to contact the sheet. Lateral rims 57 and 59 have an arcuate shape facing the drum with a radius of curvature which is approximately equal to the combined radius of the drum with sheet, typically about 5 ⅞ inches (14.9 cm). Electrode segments 61–64 are recessed in the toning shoe, relative to the support rims 53 and 55, thereby creating a space less than 10 mils (254 μm) deep for the flow of a thin film of developer adjacent to the sheet. Typically, the electrode segments are recessed about 3 mils (76 μm), with a tolerance of about 0.5 mil (12.5 μm).

The toning shoe applies developer to a localized area corresponding to a latent image stripe on the sheet. Typically, developer is injected under pressure, about 1.0 psi, at a rate of 0.2 gallons per minute, and flows in a thin film at a speed of about 25 inches per second through the space between the electrode segments and the sheet. The multi-segment central electrode is normally a grounded conductor. Support rims 53 and 55 are also electrically conducting. Developing fluid flowing in the space between the electrode segments and a sheet is subject to an electric field in those regions where charge has been deposited onto the sheet, causing toner particles suspended in the developer to be attracted to the sheet thereby creating a visible image.

For a two-inch-long toning shoe, a sheet on the drum is in contact with developer for one-sixth second at maximum drum speed. Drum speeds as slow as two inches per second can cause sheet-developer contact times of as long as one second, which if not compensated for can cause overtoning of the sheet, image running and smearing, and reduced resolution. A preferred compensation method is reduction of the toner flow rate so as to prevent overtoning. This is partly accomplished automatically by the pumping action of the moving drum. As the drum rotates more slowly, it drags less toner along with it, reducing the total toner flow.

Alternatively, the segmented electrode may be subject to a variable bias voltage to compensate for variable drum speed. At a typical maximum speed of rotation, 12 inches per second, a typical bias would be zero volts. As speed decreases negative bias increases linearly. At minimum speed, say 2 inches per second a typical bias is negative 75 volts. A bias voltage on the electrode segments reduces the electric field in the space between the multi-segment electrode and sheet by an amount sufficient to prevent overtoning. The support rims 53 and 53 must not be subjected to the bias voltage, however, as background staining of the image would probably result.

Although rims 57 and 59 confine developer substantially to the latent image stripe area, some leakage toner is always present between the shoe edge and the sheet. This leakage is unavoidable, even if the lateral rims were to contact the sheet in a close fit, due to the inherent roughness of the sheet surface. When the lateral rims 57 and 59 are electrically insulating instead of electrically conducting, they do not act as electrodes. Spaced conductive rims may cause toning outside of the latent image stripe resulting in uneven toning visible as somewhat darker bands when producing large solid areas which are colored. It is, therefore, desirable for conducting lateral rims to actually contact the sheet. This reduces the amount of toner available for toning outside the latent image stripe and leads to a more uniform image. In addition, when insulating lateral rims 57 and 59 are very slightly relieved from the sheet, triboelectric effects are greatly reduced. These effects may cause toner particles to be deposited onto the image directly or else deposited onto the rims and subsequently rubbed off onto the image. Both of these depositions lead to streaking or visible background staining of the image.

With reference to FIG. 5, the toning shoe is biased against a sheet by a single point biasing mechanism 29. A detent 129 is provided in the back of the toning shoe for receiving a pin 131 of the biasing mechanism 29. The toning shoe is also loosely secured to biasing mechanism 29 by screws 133-136 seen in FIG. 3. Extensions or tabs 138-141 extend out from the shoe and have holes 143-146 respectively. Screws 133-136 fit through holes 143-146 respectively and are partially inserted, i.e. screwed into respective holes in a base 149 of biasing mechanism 29 Screws are preferred because the amount of insertion can be adjusted. Alternatively, nails, rivets and the like can be used. The diameter of holes 143-146 should be larger than that of the shafts of the screws, but less than the diameter of the heads of the screws. This gives the toning shoe a degree of freedom to rotate about an axis, indicated by arrow $\theta$, generally perpendicular to the top surface of the shoe through detent 129. The toning shoe is also free to rotate about two other axes, indicated by arrows $\phi$ and $\psi$. The three axes $\theta$, $\phi$ and $\psi$ are mutually orthogonal. These rotational degrees of freedom are discussed further below.

The heads of the screws 133-136 define a limit of forward movement of the shoe. Biasing mechanism 29 biases the toning shoe forward, i.e. against a sheet. The forward limit is reached when tabs 138-141 on the toning shoe reach the heads of screws 133-136. Since the head diameter is larger than the diameter of the holes 143-146, the toning shoe is prevented from moving beyond this limit. The limit is not ordinarily reached during operation when the shoe is scanning a sheet on a drum, but when, for example, the shoe is retracted for cleaning, the limit of forward movement defined by the screws prevents the toning shoe from falling off. Typically, this limit is about $\frac{1}{4}$ inch (6 mm) from base 149.

Biasing mechanism 29 comprises a base 149, a lever body 151 pivotally mounted to base 149, a pin 131 on one end of lever body 151 and a spring 153 for applying a torque to lever body 151 so as to push pin 131 against the back of the toning shoe. Lever body 151 is mounted to base 149 by an axle 155. Axle 155 connects to base 149 through opposing upwardly extending blocks 157, and to lever body 151 through tabs 159 adjacent to respective blocks 157 Spring 153 attaches to two downwardly depending tabs 161 and 163. Tab 161 is fixed to base 149. Tab 163 forms part of lever body 151 and is located on the opposite side of axle 155 from pin 131. Preferably, tab 163 is oriented downward and generally perpendicular to the portion of lever body 151 between axle 155 and pin 131. When spring 153 exerts a pulling force on tab 163, the lever body pivots so as to push pin 131 upwards against the back of the toning shoe.

Typically, biasing mechanism 29 exerts a force of about four pounds (17.8 Newtons) against the toning shoe. Pin 131 is typically $\frac{1}{4}$ inch (6 mm) long, the distance between pin 131 and axle 155 is typically about one inch (25 mm), and the distance between axle 155 and the point of spring connection to tab 163 is about $\frac{1}{2}$ inch (13 mm). Spring 153 exerts a typical pulling force on tab 163 of about eight pounds (35.6 Newtons).

The toning shoe has a normal orientation for seating against a sheet on a drum. As seen in FIG. 3, this normal orientation is askew relative to the drum's rotation axis, represented by line 165 in FIG. 3. Typically, developer slits 66-69 in the toning shoe, which represent the leading edges for applying developer to a helical stripe of the sheet, are approximately four degrees askew relative to drum axis 165. Rims 53 and 55 of the toning shoe have a skewed arcuate shape so as to fit closely against a sheet on the drum when the toning shoe is in this askew normal orientation. Preferably, detent 129 is located near the center of fluid pressure of the toning shoe, so that pin 131 supports the shoe in its normal orientation as on a balance. However, the precise location of detent 129 is not highly critical.

The toning shoe is movable on pin 131 relative to the normal orientation with three degrees of freedom. Pin 131 thus acts as a gimbal for the toning shoe. A first degree of freedom is rotation about an axis, indicated by arrow $\theta$, generally perpendicular to the front surface of the shoe through detent 129, as seen in FIGS. 3–5. The toning shoe may rotate either clockwise for increased skew or counterclockwise for decreased skew, as indicated by arrows 167 in FIG. 3. A phantom toning shoe 169 is seen in FIG. 3 which is rotated counterclockwise up to the maximum allowable limit of motion. This limit may range from 0.1 to four degrees away from the normal orientation but is typically about one or two degrees away from the normal orientation.

A second degree of freedom of movement is rotation on an axis $\phi$ roughly parallel to the rotation axis of the drum about pin 131. This axis is indicated by arrow $\phi$ in FIGS. 3 and 4. The toning shoe may rotate either toward a more inclined orientation, or toward a less inclined orientation, In either case, the toning shoe is movable up to a maximum limit in the range from one to eight degrees with respect to the normal orientation. This limit is typically about five degrees.

A third degree of freedom of movement is rotation on an axis, indicated by arrow $\psi$ in FIGS. 3–5, approximately tangent of the circumference of the drum about pin 131 in the direction of drum rotation. The toning shoe may thus rotate toward a leftward orientation. In this leftward orientation, tabs 140 and 141 are lower on their screws 135 and 136, i.e. closer to base 149, than the other two tabs 138 and 139 shown in FIG. 3. The toning shoe may also rotate toward a rightward orientation, in which tabs 140 and 141 are further from base 149 than tabs 138 and 139. As with the first two rotational degrees of freedom about axes $\theta$ and $\phi$, the toning shoe is movable about axis $\psi$ up to a maximum limit with respect to the normal orientation. Again, as with rotation about axis $\phi$, this limit is typically about five degrees.

The toning shoe described above is movable simultaneously in all of the rotational degrees of freedom about three mutually orthogonal axes through the single point of biasing so as to be responsive to the local orientation of the sheet on the drum. This occurs automatically as the biasing mechanism 29 biases the shoe against the sheet. Thus the shoe is self-seating, and helical scanning is made possible without loss of image quality. Precise control of shoe orientation is thus achieved automatically at low cost.

With reference to FIG. 7, the toning shoe is assembled from a frame 81, separate electrode segments 61–64 and two lateral rim blocks 57 and 59 forming the lateral rims. The frame 81 is a single piece of metal, such as steel, which incorporates the upper and lower rims 53 and 55 respectively, the corner tabs 138–support 141, a top central surface 83 with inverted T-shaped ridges 85 for mounting electrode segments 61, 63, 65 and 67, and flat, horizontal side surfaces 171 and 173 for mounting insulating blocks 57 and 59. These surfaces contain holes 175 and 185 for screw mounting the lateral rim blocks 57 and 59 and electrode segments 61–64 to frame 81. Frame 81 also contains the inlet bore 71 seen in FIG. 5 and horizontal bore or channel 87. The drain channels 73–76 and developer slits 66–69 seen in FIG. 5 consist of gaps between electrode segments 61–64 and frame 81. The lateral rims 57 and 59 are typically made of insulating blocks of a glass/epoxy composite or of metal. The electrode segments 61–64 are separate, inlaid pieces of electrically conductive material which rests on top surface 83 of frame 81.

To make the shoe, the parts 81, 57, 59 and 61–64 are first assembled completely with a 3 mil thin shim 177 under each electrode segment. Shims 177, shown in phantom, raise electrode segments 61–64 just 5 mils higher than they would otherwise be. Lateral rim blocks 57 and 59 are secured to flat surfaces 171 and 173 respectively by three screws 179 each screwed into holes, not seen, in the bottom of blocks 57 and 59 and passing through holes 175 in flat surfaces 171 and 173. Electrode segments 61–64 are secured in the cavity, defined by support rims 53 and 55 and lateral rim blocks 57 and 59, by screws 183 screwed into holes, not seen, in the bottom of each electrode segment, passing through holes 187 in each shim 177 and passing through holes 185 in top surface 83 of frame 81.

After the first assembly, all of the upper surfaces of support rims 53 and 55, lateral rim blocks 57 and 59, and electrode segments 61–64 are lapped to fit the drum curvature. These surfaces may also be machined, ground or otherwise formed so as to fit the drum curvature. The lapping medium is slightly resilient, and since the glass/epoxy lateral rim blocks 57 and 59 are somewhat softer than the steel frame 81, these blocks lap a little faster causing them to be relieved by about 0.1 mil below the support rims 53 and 55. Alternatively, shims 178 up to two mils thick may be placed under lateral rim blocks 57 and 59. If lateral rim blocks 55 and 57 are made from electrically conductive material, no shims are used and the lapped rims are unrelieved relative to support rims 53 and 55. When the lapping is completed, the electrode segments are unscrewed and shims 177 are removed. The electrode segments are then replaced onto top surface 83 without the shims and secured by screws 183 leaving the electrode surface recessed by the exact 3 mil depth which is required. Thus, the toning shoe can be made easily without the need to hold any of the parts to close tolerance. Screws 179 and 183 preferably screw in through the frame 81 from below leaving all the upper shoe surfaces smooth and continuous.

A printer employing such a toning shoe may be seen in more detail in FIG. 8. A sheet from a feeder 201 is driven by supply roller 203 through an optical sensor 205 onto drum 211. An optical sensor consists of a light transmitter and detector, separated by a narrow space. When the light beam is interrupted, the sensor is activated. The purpose of optical sensor 205 is to time the position of the edge of the sheet when a sheet first passes through the sensor. It is important to time the sheet so that the proper position of the drum can be made available to receive the sheet.

The drum may have a pair of vacuum channels 217 and 219 which are passages embedded in the drum having pumped apertures for holding sheet 213. Preferably, the channels should be spaced to secure the top and bottom edges of a sheet. The channels are evacuated by means of a vacuum pump 216 having suction controlled by solenoids 18 which is connected through a vacuum collar 220 to the two channels 217 and 219. The first vacuum channel 217 is used to secure the top of a sheet while the other channel secures the bottom. Thus, the top channel 217 must be in approximately a 12 o'clock position to receive a sheet coming through sensor 205. The position of the drum is known from an optical encoder 222 which is a film disk having a plurality of black and clear radial stripes thereon. The marks are read by another optical sensor 224.

The diameter of drum 211 is typically about 1¾ inches (29.8 cm) and its width is wider than sheets to be supported. The edge of the drum, extending from slightly inside the region of where paper is to be supported may be slightly relieved to prevent edge wetting when using fluid developers. The drum is rotated about its axial shaft 215 by means of a continuously rotating motor 226 turning pulley 228 by means of belt 230. Motor 226 also turns a lead screw 232 by means of gears 234. Lead screw 232 carries the head 221 as well as toner shoe assembly 225 and platform 227. Head 221 and toner shoe assembly 225 are supported on a carrier assembly, not shown, which is connected to lead screw 232 by means of a retractable half nut 236. A solenoid 238 provides motion to an arm 240 which retracts half nut 236 from lead screw 232 on command. In the retracted position, no motion is imparted to the head, toning shoe assembly and platform by the lead screw. The retracted position is used for flyback, discussed below. At another command the solenoid 238 causes the half nut to come back into contact with the lead screw, thereby again providing motion to both the head and the toning shoe.

The toning shoe assembly 225 in FIG. 8 includes a multi-segment toning shoe of the type described above. The shoe is approximately the same width as the head 221. The shoe selectively applies different colors of toner to an image. For example, the toning shoe may first dispense a toner or fluid developer which supplies a yellow color to the latent image. The second toner may supply a magenta color, a third toner may supply a cyan color and a fourth toner may supply a black color. Other color sequences may also be used.

With half nut 236 in contact with lead screw 232, the shoe assembly 225 moves to the right as head 221 scans paper on rotating drum 211. Drum rotation is at about 10 to 20 rpm. When the head reaches the right hand edge of the paper, this is detected by a flag 242 extending from platform 237 on which the shoe assembly 225 is riding. The entire assembly is being driven by half nut 236. Although the platform is connected to belt 244, the belt is not driven until the flag 242 projects into the optical sensor 246. When this occurs, half nut 236 is retracted from lead screw 232 by solenoid 238 and the retracted position is sensed by an optical sensor 248. In the retracted position, the head 221 and shoe assembly 225 are no longer driven. At this time, a motor 250 turns another screw 252, placing toning shoe assembly 225 directly in front of cleaning station 245, where the toning shoe assembly is rinsed with solvent supplied from a solvent supply tank 253 by means of a pump 263 via inlet line 247 to cleaning station 245 and via inlet line 31 to shoe assembly 225. Motor 250 is again activated after rinsing to return shoe assembly 225 to the retracted position at the right edge of drum 211. Then flyback motor 254 is energized and belt 244 is caused to move in the opposite direction, carrying platform 237, shoe assembly 225 and head 221 back to an initial position. The arrival of platform 237 at this initial position is sensed by optical sensor 256 sensing the flag 242. When this occurs, the solenoid 238 advances arm 240 until the optical sensor 258 senses the forward position of the arm, at which half nut 236 engages lead screw 232. The shoe assembly 225 successively supplies yellow, magenta, cyan and black liquid developer to the latent image to produce a visible color image The order in which the colors are successively applied may differ from the above.

In FIG. 8, the position of the toner shoe appears shown somewhat removed from the drum. The actual position of the toning shoe is one very closely spaced to the sheet 213, a central electrode portion of the shoe being separated from the paper by only a few mils. Each toning shoe carries a drying roller, such as roller 237, which removes about 99 percent of the excess fluid from the sheet 213. A wiper blade 239 removes excess fluid from the wiper roller 237. The remaining one to three microns of fluid on the sheet evaporates in five to twenty seconds. The roller 237 is powered by motor 260 transmitting rotary force through belt 262. Fluid developer or toner is supplied to the toning shoe from supply tanks 255, 257, 259 and 261. Solvent is supplied to both the toning shoe and cleaning station 245 from solvent supply tank 253. Pumps 265, 267, 269 and 271 transmit developer through solenoid valves 275, 277, 279 and 281 into a flexible conduit 283, while a pump 263 transmits solvent through solenoid valve 273 into flexible conduit 283. Pump 263 also transmits solvent through another solenoid valve 274 into inlet tube 247. Each valve is a solenoid which operates at about 5 pounds per square inch of fluid pressure. Each of the supply tanks 255-261 contains a color developer or toner. Valves 273, 275, 277, 279 and 281 cooperate with a toner manifold 285 to selectively deliver one of the fluid developers or solvent to the toning shoe assembly 225 via inlet line 231. Drain lines as shown return the spent toner to the appropriate supply tank.

An electrical control box 287 receives a block of digital data consisting of bits to be printed on a sheet. An operator may initiate printing through a control panel 289. The control box 287 divides the block of digital bits to be printed into columns to be sequentially transmitted to the printer one after another so that printing appears to be in the form of helical scanning of the paper, with one column continuously fed after another. A momentary pause in printing may be used in going from one column to the next at the top and bottom of a page where margins may exist or a gap in the wrap of a sheet about the drum. This may be achieved by turning valves 275, 277, 279 and 281 on and off and by interrupting the digital data being fed to write head 221. The write head 221 may also be momentarily retracted by a retraction mechanism, not shown, while passing over the gap in the wrap of the paper about the drum. Within each column of data, the width of a column is taken as a digital word. This width corresponds to the writing width of the head. The pitch of the lead screw and the rate of rotation of the drum are synchronized so that columns abut, edge to edge, without overlap or gap. Use of liquid toner allows edges to blend so that they are not discernible in the final image. Each ditigal word is transmitted in a flat electrical cable 290 to head 221. A digital word, consisting of say 1,024 bits is transmitted to the head. A source of high voltage applied to the head allows the binary bits to be converted to electrical charge transferred onto sheet 213 by the linear array of wires in the head. Paper to be written upon is treated with a dielectric substance for charge retaining purposes.

After printing a series of columns, which appear to be helical stripes and then toning with a developer of a first color, the head is caused to fly back for a second pass. After this is complete, the head is caused to back for a third scan with developer of the third color. Finally, upon completion of this scan, the head is again caused to fly back and then again scan across the paper applying toner of the fourth color, the toner shoe been rinsed after each scan. Toners associated colors may be used to form a color printed image. After the fourth pass, paper is released from drum 11 by releasing vacuum in the channels 217 and 219 by moving the pickoff fingers 291 into contact with the drum, thereby causing sheet 213 to slide over the pickoff fingers as indicated by the dashed arrows 293 and sheet 295. Passage of the sheet 295 past the pickoff fingers is sensed by an optical sensor 297. The pickoff fingers are moved by a solenoid 299 which can adjust the fingers to move into ejection position once printing is complete. Control panel 289 has various status indicators for signalling printing progress as well as manual override controls for interrupting printer operation or resetting the printing.

FIG. 9 shows a sheet 13 consisting of columns 301, 303, 305, 311 and so on. A page margin 307 exists on the left side and a page margin 309 exists on the right hand side. In these page margins, no printing exists. The area of the paper accessable for printing is desirably a multiple of the width of the head. In the example of FIG. 9, fourteen columns are shown, each column being the width of the head. To print sheet 13 fourteen revolutions of the drum per color would be necessary, with page margins 307 and 309 being blank since the head did not pass over these regions. The lateral motion of the head is smooth and continuous so that when the paper sheet is wrapped about the drum, the columns appear to be a continuous helical spiral, without any spaces or overlap in the spiral pattern. For paper which is 48 inches in width, 18 columns are typically printed.

FIG. 10 illustrates a printing sample within a column indicated by the dashed circle 10 in FIG. 9. In FIG. 10, the head and a toner shoe has moved over column 311 developing a latent image and this latent image has been toned to form a dot pattern 313, the dots appearing to be in rows and columns. The maximum number of dots possible equals the number of wire elements in the head extending from side to side. The dot pattern of FIG. 10 is merely illustrative of the writing of digital words with bit patterns which span a column from edge to edge. The bit patterns consist of the presence and absence of charge which is made visible by toning. Where charge is applied, the image is toned, giving a dark dot appearance. Since the charge is quite localized, the pattern appears to be a grid-like array of dots. Each position in the array is an image pixel which is either dark or light depending upon whether charge was deposited in an array location.

FIG. 11 shows that the head 221 consists of a series of very fine wires 315 deposited on a very thin circuit board 317. It is possible to use charging elements other than wires, but in this case wires present a manufacturing advantage. The wires extend completely across the board, on upper and lower surfaces. This is illustrated in FIG. 12 where the board 317 is seen endon. It has an upper set of wires 319 and a lower set of wires 321. Alternatively, a single row of wires may be used. The board itself is only about 2.5 mils thick. The wires or charging elements are positioned at a density of more than 150 wires per centimeter or about 400 wires per inch, with 512 wires per side and an air or other insulative gap between adjacent wires so that they do not short each other out. As may be seen, the two sets of wires are slightly offset from each other, with a total of 1024 wires on two sides. This number is selected because it is convenient for digital processing. The wires 319 and 321 may be parallel, mutually insulated traces which are plated onto board 317 using well-known photolithographic techniques. One of the advantages of the present invention is that the head used herein is relatively inexpensive compared to line printer heads and other full width electrostatic heads which are very expensive.

With reference to FIG. 13, an exploded detail of drum 211 is seen. An edge 212 of the drum 211 may have a recessed shoulder 210 which is approximately one-fourth inch below the principal drum surface 214. The sheet of paper 213 overhangs the main drum surface 214 by a fraction of an inch. If the toning shoe 223 passes over overhanging portion 213, excess developer will run down the face of the shoe and avoid contact with drum 211. Without the presence of the recessed shoulder, developer could enter the small space between sheet 213 and drum 211 and by capillary action spread onto the back side of sheet 213 and onto the main drum surface, causing a buildup of toner on the drum. This could lead to deterioration of the drum surface, since a residue of toner particles would accumulate on the drum. The recessed shoulder portion 10 exists on opposite sides of the drum.

With reference to FIG. 14, a toning shoe 223 may selectively communicate with each of four color developers by means of a manifold 285 and four valves 275, 279 and 281. A rinsing solvent may also be supplied to toning shoe 23 via a valve 273 and manifold 285. For example, a first supply line 266 may communicate with a supply of yellow developer, a second supply line 268 may communicate with a supply of magenta developer, a third supply line 270 may communicate with a supply of cyan developer and a fourth supply line 272 may communicate with a supply of black developer. Supply line 264 may communicate with a supply of solvent. Valves 275, 277, 279, 281 and 273 connect to supply lines 66, 268, 270, 272 and 264 respectively and control which developer or solvent is delivered to toning shoe. These valves correspond exactly to valves 275, 277, 279, 281 and 273 in FIG. 8. Lines 325, 327, 329, 331 and 323 connect valves 275, 277, 279, 281 and 273 respectively to manifold 285. Manifold 285 has a common channel 333 which delivers the developer to an inlet line 231 and thence to toning shoe 223. All tubing, which form the lines, as well as passages in manifold 285 have an interior diameter of about ⅛ inch (3.2 mm).

With reference to FIGS. 15 and 16 a drain selector foot 241 selects a drain tube 242a, b, c or d for returning used developer to the correct supply tank. Foot 241 is pivoted about a pivot or ankle 335 at an end of foot 241 in an either counterclockwise or clockwise direction, as indicated by arrows B and C respectively. The position of foot 241 is detected by sensors 337. Sensors 337 may be optical sensors consisting of a light transmitter and a detector, separated by a narrow space. When the light beam is interrupted, as by a flag 339 depending from foot 241 passing through a sensor, the sensor is activated and the position of the foot is known.

Pivoting foot 241 brings one of four openings 341 through foot 241 into line directly beneath the drain tube 235 of toning shoe assembly 225. Used developer flows in the direction of arrows 343 and 345 from drain tube 235 through an opening 341, and through a recycling tube, such as tube 243b, back to a supply tank. Drain tube 235 is pointed like a quill to prevent drops of developer therein from staying in the drain tube 235. Each of the openings 341 connects to a toner recycling tube 243a, b, c or d leading back to developer supply tanks.

Foot 241 is driven into a selected position for returning developer to the appropriate supply tank by peg disc drive 347 powered by a servo motor 349 through a shaft 351. Peg disc drive 347 comprises a disc 353 and four upstanding pegs 355 projecting upwardly from disc 353. Motor 349 receives commands from a control box, such as box 287 seen in FIG. 8. Foot 241 has a plurality of toes 357, typically six in number, which extend from an end of foot 241 opposite ankle 335. The toes define spaces 359, typically five in number, between toes 357. These spaces receive pegs 355. Preferably, pegs 355 are arranged on disc 353 in a square so that every turn of ninety degrees by disc 353 brings new peg into engagement with a space 359 between toes 357. Peg disc drive 347 can turn either clockwise or counterclockwise, as indicated by arrow D. Turning drive 347 clockwise forces the lower left peg engaging foot 241 in FIG. 15 to push against a toe causing foot 241 to pivot in counterclockwise direction B. Likewise, turning drive 347 counterclockwise pivots foot 241 in clockwise direction C. Each ninety degree turn of drive 347 brings a different opening into position beneath drain tube 235.

With reference to FIG. 17, a cleaning station 245 receives a cleaning solvent indicated by arrows 361 and 363, from a solvent supply tube 247 which divides into two solvent supply tubes 247a and 247b and connects to back surface 363 of cleaning station 245 at two places 365 and 367. Channels 369 and 371 through cleaning station 245 transport solvent from supply tubes 247a and 247b to the front surface 373 of cleaning station 245. Front surface 373 is shaped to conform to a toning shoe, such as shoe 223 seen in phantom in FIG. 17. Front surface 373 is also shaped at bottom region 375 to receive drying roller 237. A ridge 377 separates the top region of front surface 373 for rinsing toning shoe 223 from bottom region 375 for rinsing roller 237. Channels 369 and 371 may incorporate cross channels, not shown, and a plurality of outlet openings in front surface 373 to more effectively spread the cleaning solvent across the width of the shoe 223 and drying roller 237.

In operation, with reference to FIGS. 8, 14 and 17, when toning shoe assembly 225 completes a scan of sheet 213 on drum 211, the color valve 275, 277, 279 or 281 is turned off. The appropriate developer pump, corresponding to pump 265, 267, 269 or 271 in FIG. 8, is also turned off. Toning shoe assembly 225 is then retracted from the sheet and advanced past the end of drum 211 to cleaning station 245. Toning shoe 223 engages cleaning station 245, valve 273 is opened and a cleaning solvent, such as ISOPAR, is pumped to toning shoe 223. The valve 275, 277, 279 or 281 corresponding to the previously delivered color, is again opened for about 0.1 sec to push colored fluid back from the common channel 333. Solvent is delivered through inlet line 231 as well as channel 369 for rinsing the toning shoe 223. Rinsing typically lasts for about 3 seconds. An abundance of solvent flows in space 379 between the electrode segments 381 and front surface 373. Preferably, enough solvent is flowing to lift toning shoe 223 slightly so as to also rinse support rims 383 and 385, as well as the lateral rims, not shown. The excess solvent flows into drain passages in the lateral rim blocks and spills into funnel 249, as indicated by arrows 387, for return to the solvent supply tank. At the same time as toning shoe 223 is rinsed, drying roller 237 and wiper blade 239 are also rinsed with solvent from channel 375. Excess solvent also falls into funnel 249. After rinsing, valve 273 is turned off, and toning shoe assembly 223 is disengaged from cleaning station 245 and returned to drum 211 for a new scan. After the last scan of a sheet, the toning shoe may be left engaged against cleaning station 245 until the printer is next used. Printers with four toning shoes may be provided, each with their own supply of color developer, and do not require a cleaning station. These shoes may be wiped clean periodically.

While the invention has been described with reference to developing of electrostatic latent images produced by wires or conductive tracks, the same structure may be easily adapted for developing electrostatic latent images on substrates, with latent images having been produced by other means such as ionographic writing or by electrophotographic means. Still other applications may involve development of photographic latent images with fluid developer.

We claim:

1. Apparatus for applying fluid developer to a latent image on a sheet supported by a backing member comprising, a shoe having raised peripheral edges and a central recessed area surrounded by said peripheral edges, said peripheral edges including an upstream and a downstream support rim, said central recessed area including a multisegmented electrode with a plurality of substantially uniform electrode segments closely spaced from a supported sheet bearing a latent image stripe, each electrode segment having an upstream side and having a downstream side distant said upstream support rim relative to said upstream side of the electrode segment, said central recessed area having pluralities of developer supplies and drains extending parallel said electrode segments, each electrode segment spaced apart from an adjacent electrode segment by a developer supply and a drain, each supply located at said upstream side of an associated electrode segment and in communication with a supply of fluid developer for applying the developer to the sheet, each drain located at said downstream side of an electrode segment and immediately adjacent a supply with no intervening electrode between the immediately adjacent supply and drain, pressure means for injecting fluid developer to each supply and creating a plurality of substantially distinct flows of developer from said upstream sides of said electrode segments toward the associated drain at the downstream side of each electrode segment, means for biasing said shoe against said sheet, and means for removing excess developer from each said drain and away from said sheet.

2. The apparatus of claim 1 wherein said raised peripheral edges comprises, upstream and downstream support rims contacting said sheet, and two opposed lateral rims positioned at least closely proximate opposed lateral boundaries of said latent image stripe on said sheet.

3. The apparatus of claim 2 wherein said lateral rims are electrically insulating and spaced less than two mils from said sheet.

4. The apparatus of claim 2 wherein said lateral rims are electrically conductive and contact said sheet.

5. The apparatus of claim 2 wherein said means for removing excess developer comprise, passageways in at least one of said lateral rims in fluid communication with each of said drains.

6. The apparatus of claim 5 wherein said drains defined by said electrode segments comprise, channels between said downstream support rim and one of said electrode segments and between adjacent electrode segments, each of said channels in fluid communication with said passageways in said lateral rims.

7. The apparatus of claim 1 wherein said electrode segments are electrically conductive pieces mounted in said central recessed area.

8. The apparatus of claim 1 wherein said supplies are slits defined between said upstream support rim and one of said electrode segments and between adjacent electrode segments, said slits being in communication with a supply of fluid developer under pressure.

9. The apparatus of claim 1 wherein each electrode segment is spaced a distance less than 10 mils from said sheet whereby a thin film of developer flows between each segment and said sheet, said developer being substantially confined to a localized area of said sheet corresponding to said latent image stripe, fluid developer flowing over an area adjacent a particular electrode segment being substantially confined to that area.

10. The apparatus of claim 1 wherein said sheet is supported on a rotatable drum, the apparatus further comprising means for moving said shoe laterally while said drum is rotating thereby scanning said sheet in a helical pattern.

11. The apparatus of claim 1 wherein said biasing means comprises,
a base at a fixed distance from said sheet,
a lever body pivotally mounted to said base,
a pin on one end of said lever body contacting a back of said shoe at a single point thereof, and
means for applying torque to said lever body so as to cause said pin to push against said shoe.

12. A toning shoe for use in an electrostatic printer comprising,
a frame having opposed upper and lower support rims, a central surface between said support rims and a pair of lateral flat surfaces bounding said central surface,
two blocks mounted on said lateral flat surface to form lateral rims, and
a multi-segmented electrode mounted to said central surface, said multi-segmented electrode including a plurality of electrically conductive electrode segments recessed relative to said support rims by a depth of less than ten mils, each of said electrode segments an upper end associated in side-by-side relation with a developer supply slit in communication with a supply of fluid developer, each of said electrode segments having a lower end in side-by-side relation with a drain channel in communication with passageways formed in at least one of said blocks for removing excess developer from said drain channel, the lower end of each electrode segment being distant the upper support rim relative to the upper end of said electrode segment, each electrode segment spaced apart from an adjacent electrode segment by a drain channel and by a developer supply slit, where the drain channel and developer supply slit are immediately adjacent to each other such that no intervening electrode is present between the immediately adjacent developer supply slit and drain channel.

13. The toning shoe of claim 12 wherein said blocks are electrically insulating and relieved relative to said support rims by a depth of less than two mils.

14. The toning shoe of claim 12 wherein said blocks are electrically conductive and unrelieved relative to said support rims.

15. The toning shoe of claim 12 wherein said central surface of said frame has a plurality of ridges separating said electrode segments, said developer supply slits being defined between an upper end of said electrode segments and said ridges and between an upper end of one of said electrode segments and said upper support rim, said drain channels being defined between a lower end of said electrode segment and said ridges and between a lower end of one of said electrode segments and said lower support rim, said ridges separating adjacent developer supply slits and drain channels from one another.

16. The toning shoe of claim 15 wherein an inlet is formed through a back of said frame to said central surface, said inlet in fluid communication with a supply of fluid developer, and wherein a bore connected to said inlet is formed in said central surface, said bore connecting to each of said slits for delivering fluid developer to said slits.

17. An apparatus for applying fluid developer to a latent image on a sheet supported on a backing member, comprising:
a drum having a round circumferential surface capable of supporting a sheet carrying an electrostatic latent image,
a toning shoe having a toning surface matching a region of the circumferential surface of the drum, said toning shoe having raised peripheral edges including upstream and downstream support rims in contact with said sheet, said toning surface defined by a central recessed area surrounded by said raised peripheral edges and further defined by a plurality of substantially uniform electrode segments closely spaced from said sheet, each electrode segment having an upstream side and having a downstream side distant said upstream support rim relative to said downstream side, each electrode segment spaced apart from adjacent electrode segments by a developer supply and a drain, said supplies parallelly disposed such that each supply is at an upstream side of an electrode segment, said drains parallelly disposed such that each drain is at a downstream side of an electrode segment and is immediately adjacent to the supply associated with the electrode segment downstream said drain with no intervening electrode between the immediately adjacent supply and drain,
pressure means for injecting fluid developer to each supply, thereby creating a plurality of distinct flows of developer over said electrode segments towards said drains, said flows being uniform in direction from said upstream sides to said downstream sides of the electrode segments,
means for biasing said shoe against said sheet,
means for moving said toner shoe relative to said drum and across said sheet, and
means for removing excess developer from each said drain and away from said sheet.

18. The apparatus of claim 17 wherein said raised peripheral edges include upstream and downstream support rims contacting said sheet and include two opposed lateral rims at least closely adjacent said sheet.

19. The apparatus of claim 18 wherein said lateral rims are electrically conductive and contact said sheet.

20. The apparatus of claim 17 wherein said drains are channels between said downstream support rim and one of said electrode segments in between adjacent electrode segments.

21. The apparatus of claim 17 wherein said supplies are slits extending between said upstream support rim and one of said electrode segments and between adjacent electrode segments, said slits being in communication with a supply of fluid developer under pressure.

* * * * *

UNITED STATES PATENT AND TRADEMARK OFFICE
CERTIFICATE OF CORRECTION

PATENT NO. : 4,784,080

DATED : November 15, 1988

INVENTOR(S) : Andreas Bibl et al.

It is certified that error appears in the above-identified patent and that said Letters Patent is hereby corrected as shown below:

Column 1, line 21, "latent image of" should read -- latent image on --.

Column 1, line 25, "remain on contact" should read -- remain in contact --.

Column 1, lines 26-27, "obtain in adequate" should read --obtain an adequate--.

Column 4, lines 17-18, "charge retaining-dielectric medium" should read -- charge retaining dielectric medium --.

Column 4, line 19, "are sold under" should read --are sold, for example, under--.

Column 4, line 30, "by head is" should read -- by head 21 is --.

Column 4, line 31, "Head and" should read -- Head 21 and --.

Column 4, line 36, "pattern 7" should read -- pattern 27 --.

Column 5, lines 45-46, "channels 3-76" should read -- channels 73-76 --.

Column 5, line 48, "segments 613" should read -- segments 61-63 --.

Column 5, line 62, "about 5/8 inch" should read -- about 3/8 inch --.

Column 7, line 34, "support rims 53 and 53" should read --support rims 53 and 55 --.

Column 8, line 3, "mechanism 29 Screws" should read --mechanism 29. Screws--.

Column 8, line 37, "blocks 157 Spring" should read --blocks 157. Spring --.

Column 9, line 55, "tabs 138-support 141," should read --tabs 138-141, --.

Column 10, line 59, "by solenoids 18" should read -- by solenoids 218 --.

UNITED STATES PATENT AND TRADEMARK OFFICE
CERTIFICATE OF CORRECTION

PATENT NO. : 4,784,080

DATED : November 15, 1988

INVENTOR(S) : Andreas Bibl et al.

It is certified that error appears in the above—identified patent and that said Letters Patent is hereby corrected as shown below:

Column 11, line 1, "about 1 3/4 inches" should read
-- about 11 3/4 inches --.

Column 11, line 52, "inlet line 31" should read -- inlet line 231 --.

Column 12, line 65, "caused to back" should read --caused to fly back --.

Column 13, line 1, "the toner shoe been rinsed" should read
-- the toner shoe having been rinsed --.

Column 13, line 2, "Toners associated colors" should read
-- Toners associated with primary colors --.

Column 13, line 5, "217 and 219 by moving" should read
-- 217 and 219 and by moving --.

Column 13, line 18, "left side" should read -- left hand side --.

Column 13, line 56, "board 317 is seen endon." should read
-- board 317 is seen end-on. --.

Column 14, lines 27-28, "275, 279 and 281" should read
-- 275, 277, 279 and 281. --.

Column 14, line 38, "lines 66, 268, 270" should read
-- lines 266, 268, 270 --.

UNITED STATES PATENT AND TRADEMARK OFFICE
CERTIFICATE OF CORRECTION

PATENT NO. : 4,784,080

DATED : November 15, 1988

INVENTOR(S) : Andreas Bibl et al.

It is certified that error appears in the above-identified patent and that said Letters Patent is hereby corrected as shown below:

Column 14, line 49, "tube 242a" should read - - tube 243a - -.

Column 14, line 66, "Drain; tube 235" should read - - Drain tube 235 - -.

Claim 2, column 16, line 56, "edges comprises" should read - -edges comprise - -.

Signed and Sealed this

Nineteenth Day of December, 1989

Attest:

JEFFREY M. SAMUELS

Attesting Officer     Acting Commissioner of Patents and Trademarks